(12) United States Patent
Iwanaga et al.

(10) Patent No.: US 9,746,994 B2
(45) Date of Patent: Aug. 29, 2017

(54) ICON DISPLAY OF FILE HISTORY RECORDED IN STORAGE AS ADDITIONAL DATA

(71) Applicant: International Business Machines Corporation, Armonk, NY (US)

(72) Inventors: Masayuki Iwanaga, Urayasu (JP); Yumiko Ohta, Yokohama (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 14/476,324

(22) Filed: Sep. 3, 2014

(65) Prior Publication Data

US 2015/0082247 A1    Mar. 19, 2015

(30) Foreign Application Priority Data

Sep. 18, 2013    (JP) .................................. 2013-193291

(51) Int. Cl.
*G06F 3/048*    (2013.01)
*G06F 3/0481*    (2013.01)
*G06F 17/30*    (2006.01)

(52) U.S. Cl.
CPC .... *G06F 3/04817* (2013.01); *G06F 17/30126* (2013.01); *G06F 17/30185* (2013.01)

(58) Field of Classification Search
CPC ....................................................... G06F 3/048
See application file for complete search history.

(56) References Cited

U.S. PATENT DOCUMENTS

| 2004/0119757 | A1* | 6/2004 | Corley | ............... | G06F 3/04817 |
| | | | | | 715/837 |
| 2006/0005125 | A1* | 1/2006 | Reponen | ............... | G06F 17/248 |
| | | | | | 715/243 |
| 2012/0323934 | A1* | 12/2012 | Amir | ................. | G06F 17/30091 |
| | | | | | 707/752 |

FOREIGN PATENT DOCUMENTS

| JP | 05-241765 A | 9/1993 |
| JP | 2011-100419 A | 5/2011 |

* cited by examiner

*Primary Examiner* — Matthew Ell
(74) *Attorney, Agent, or Firm* — Stosch Sabo

(57) ABSTRACT

An icon corresponds to a history of files related to a plurality of indexes. Each of the indexes and each of the files are additionally and synchronously recorded in storage as additional data. The icon displayed represents the status of data in the files in the storage. The displayed icon is manipulated to indicate whether no data exists in an associated file or to indicate that existing data in an associated file was updated.

7 Claims, 8 Drawing Sheets

COLOR INDICATING DATA BEING UPDATED (DIFFERENT FROM COLOR INDICATING DATA BEING DELETED)

ICON DISPLAY OF FILE HISTORY RECORDED IN STORAGE AS ADDITIONAL DATA

FIELD

Embodiments of the present invention relate to a technique for icon-displaying a file deletion and update history recorded in storage as additional data. More particularly, embodiments of the invention relate to a rollback function of a linear tape file system (LTFS) in a tape storage medium.

DESCRIPTION OF THE RELATED ART

There is a system, called LTFS, which uses a tape storage medium via a file system. In LTFS, a file itself is recorded on a tape medium as well as metadata, called an index, related to the recorded file, such as a file name, is also recorded on the tape medium. The process of recording an index on a tape medium is called sync. Thus, each of the indexes and each of the files are additionally and synchronously recorded as additional data, on the tape storage medium. In consequence, a history of the files is related to a plurality of indexes. The timing of sync can be set by a user, but a default sync may be every five minutes.

In LTFS, a file written to the tape medium remains recorded thereon until the tape medium is formatted again. In other words, even if a file recorded on a formatted tape medium is updated or deleted in LTFS, a yet-to-be updated file or a deleted file can be accessed by rolling back to an index written by past sync. The process of going back to a past index is called rollback. Currently, the amount of a history of indexes can be known, but it is challenging to understand the amount of an update history of files on a tape medium and the time of deletion of a deleted file.

It is impractical to require a user to make rollback to all the indexes recorded on a tape medium to check the metadata of the recorded file related to each index. A visual approach with a graphical user interface (GUI) is effective for a user in this respect.

SUMMARY

Since it is impractical to require a user to make rollback to all the indexes recorded on a tape medium to check the metadata of the recorded file related to each index, what is needed is a visual approach with a graphical user interface (GUI) to effectively inform the user of modifications of data within a file.

These and other embodiments, features, aspects, and advantages will become better understood with reference to the following description, appended claims, and accompanying drawings.

In an embodiment, a method of displaying icons on a display includes receiving a request for displaying an icon corresponding to a file recorded upon a storage medium, referring to a first index recorded upon the storage medium, determining whether, for the first index, data exists in the file corresponding to the received request, and displaying a first icon if the data exists.

Displaying the first icon may further include determining whether the first icon is displayed on the display, if the first icon is displayed, determining whether the data that exists in the file is updated, and if the data that exists in the file is updated, displaying overlapping the first icon an overlapping icon to indicate the data is updated.

Displaying the first icon may further include determining whether the first icon is displayed on the display, if the first icon is displayed, determining whether the data that exists in the file is updated, and if the data is updated, displaying an colored section having an first color within the first icon indicating the data is updated.

Displaying the first icon may further include determining whether the first icon is displayed on the display, if the first icon is displayed, determining whether the data that exists in the file is updated, and if the data is updated, deforming the first icon in a first deformation direction indicating the data is updated.

In other embodiments, one or more of the methods may be performed by a processor executing program instructions stored upon a non-transitory computer program product. For example, an LTFS may perform one or more of the methods to display an icon on a display.

In another embodiment, icons are represented on a display by computer execution of program instructions recorded upon a storage medium. The icons correspond to a history of files related to a plurality of indexes and each of the plurality of indexes and each of the plurality of files are additionally and synchronously recorded upon the storage medium. The icons represent a status of data in the files in the storage.

If no data exists in a file, a first icon may be displayed and a section is displayed within the first icon to indicate data was deleted. If data exists in the file and has been updated, an overlapping icon may be displayed overlapping the first icon to indicate the data is updated. An associated number of overlapping icons may be displayed each overlapping respective overlapping icons to depict the number of instances the files was updated. In certain embodiments, associated metadata is capable of being referred to by a user (e.g. GUI user) clicking an overlapping icon.

Alternatively, if no data exists in the file, the first icon may be displayed and a first section having a first color may be displayed within the first icon to indicate the data was deleted. If data exists in the file and has been updated, a section having a second color may be displayed within the first icon to indicate the data was updated. In embodiments, associated metadata is capable of being referred to by the user by clicking a different colored section of the first icon.

Alternatively, if no data exists in the file, the first icon may be displayed deformed in a first deformation direction to indicate the data was deleted. If data exists in the file and has been updated, the first icon may be displayed deformed in a second direction to indicate the data was updated. In embodiments, associated metadata is capable of being referred to by the user by clicking an extended or deformed section or part of the icon.

In certain embodiments, the user clicking a part of the first icon leads to rollback in a tape storage medium, the clicking being to access a yet-to-be updated file and to access a deleted file.

In another embodiment, a system displays the first icon upon a display, the system being configured to receive the request for displaying an icon corresponding to the file recorded upon the storage medium, refer to the first index recorded upon the storage medium, determine whether, for the first index, data exists in the file corresponding to the received request, and display the first icon if the data exists.

The system may be further configured to determine whether the first icon is displayed on the display, if the first icon is displayed, determine whether the data that exists in the file is updated, and if the data that exists in the file is updated, display overlapping the first icon an overlapping icon to indicate the data is updated.

The system may be further configured to determine whether the first icon is displayed on the display, if the first icon is displayed, determine whether the data that exists in the file is updated, and if the data is updated, display an colored section having an first color within the first icon indicating the data is updated.

The system may be further configured to determine whether the first icon is displayed on the display, if the first icon is displayed, determine whether the data that exists in the file is updated, and if the data is updated, deform the first icon in a first deformation direction indicating the data is updated.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The drawings are not necessarily to scale. The drawings are merely schematic representations, not intended to portray specific parameters of the invention. The drawings are intended to depict only exemplary embodiments of the invention. In the drawings, like numbering represents like elements.

DETAILED DESCRIPTION

It is an object of one or more embodiments to provide an icon for denoting a file history recorded on storage as additional data. More specifically, the icon is provided to facilitate visual understanding the amount or extent of an associated file's update history stored upon a tape storage medium and/or the time that which the file was deleted.

In an embodiment, when files recorded on a tape medium in the LTFS format are denoted via a GUI, icon symbols are overlapped depending on the number of updates to enable a user to readily understand the number of updates of files and execute rollback to each file by clicking any overlapped icon symbol.

In another embodiment, when files recorded on a tape medium in the LTFS format are denoted via a GUI, colors are added to an icon depending on the number of updates to enable a user to readily understand the number of updates of files and execute rollback to each file by clicking any different-color part of an icon.

In another embodiment, when files recorded on a tape medium in the LTFS format are denoted via a GUI, an icon is extended depending on the number of updates to enable a user to readily understand the number of updates and execute rollback of each file by clicking any deformed (e.g., extended in a width direction) part of an icon.

In yet another embodiment, the icon can be readily viewed in its entirety, which enables a user to refer to the metadata of each file recorded on a tape medium, allows for rollback to any of the indexes, and obviates the need for scrutinizing the metadata of the recorded file at each index. Rollback to each file may be enabled by clicking an overlapped icon, a different-color part of an icon, a deformed part of an icon, etc.

Figure 1:
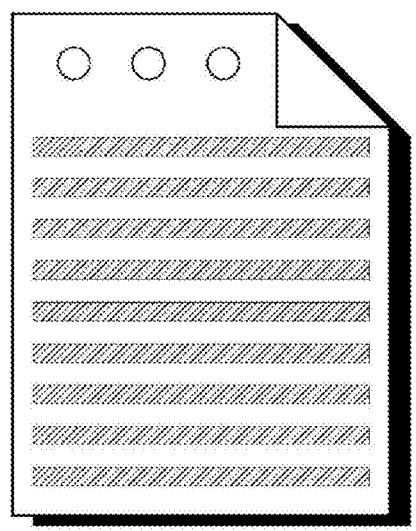
FIG. 1 illustrates an example of an icon of a file in accordance with embodiments of the present invention.
Figure 2:
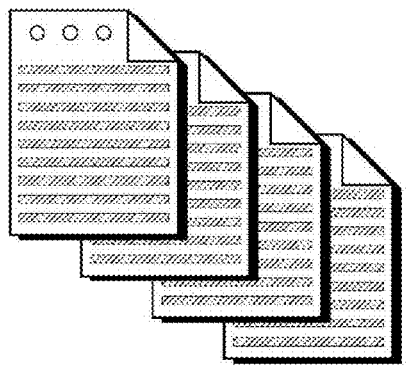
FIG. 2 illustrates an example of an icon of a file recorded on a tape medium and updated three times in accordance with embodiments of the present invention.

A file that is recorded on a tape storage medium and remains not updated is denoted by an icon as illustrated in FIG. 1. A file that is recorded on a tape medium and then updated may be denoted by an icon having symbols overlapped. For example, if the file is updated three instances, the icon includes four overlapping symbols, as illustrated in FIG. 2. A first symbol is associated with the original file and each additional symbol is associated with a respective update. For instance, if the upper leftmost symbol is clicked, the latest contents of the file are displayed, and in contrast, if the lower rightmost symbol is clicked, the oldest contents of the file recorded first on the tape medium are displayed. In certain embodiments, newer file contents are associated with upper left symbols.

Figure 3:
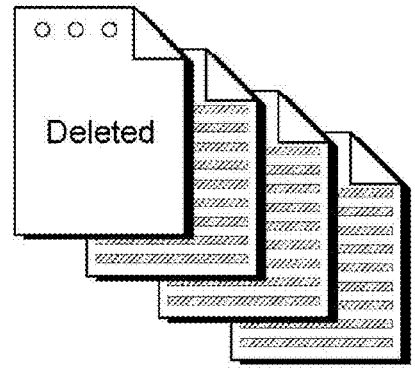
FIG. 3 illustrates an example of an icon of a file recorded on a tape medium, updated three times, and then deleted in accordance with embodiments of the present invention.

One or more symbols do not entirely overlay another at the same position, i.e., they are displayed overlapping each other, so as to enable a user to distinguish the symbol to be clicked from the other(s). This icon display enables a user (e.g. GUI user, etc.) to readily understand the number of updates of files and execute rollback to each file by clicking an icon symbol. In embodiments, a file recorded on a tape storage medium and then deleted is denoted using an overlapping icon symbol indicating the file was deleted, as illustrated in FIG. 3.

Figure 4:
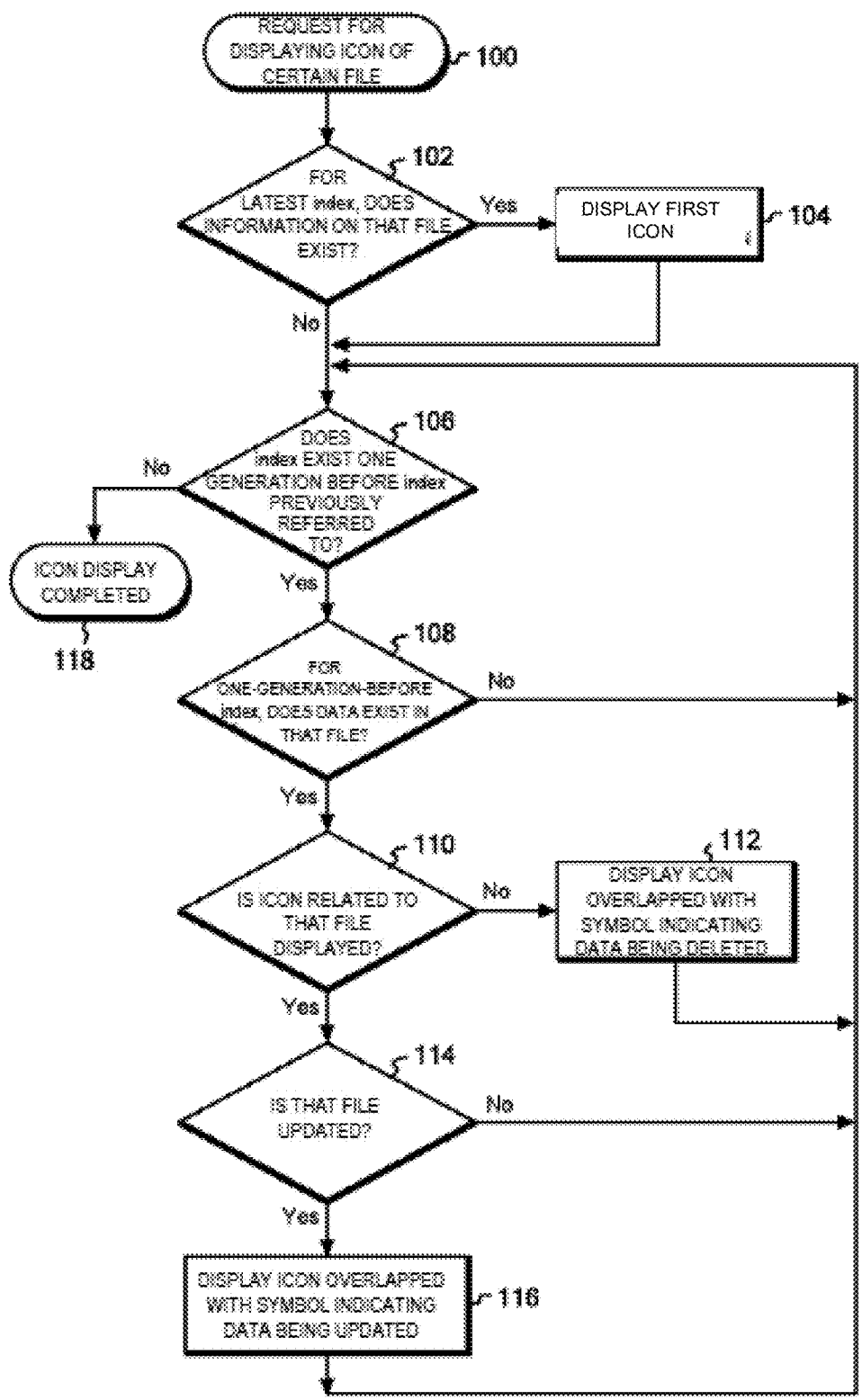
FIG. 4 is a flow chart of an exemplary method of displaying an icon in accordance with embodiments of the present invention.

FIG. 4 shows a flow chart of the behavior of LTFS for displaying an icon. At block 100, the LTFS receives a request that an icon associated with a file be displayed. At block 102, it is determined whether information on the file exists for the latest index. At block 104, if the determination at block 102 is affirmative, an icon (e.g. icon of FIG. 1, etc.) is displayed. At block 106, if the determination at block 102 is negative, it is determined whether an index exists one generation before the previous index. At block 118, if the determination at block 106 is negative, the icon display method is completed.

At block 108, if the determination at block 106 is affirmative, it is determined whether data exists in the file for the index one generation prior to the previous index. If the determination at block 108 is negative, the icon display method returns to block 106. At block 110, if the determination of block 108 is affirmative, it is determined whether an icon related to the file is displayed. At block 112, if the determination at block 110 is negative, an overlapped icon is displayed with an indication that data was deleted (e.g. icon of FIG. 3, etc.) and, in turn, the icon display method returns to block 106.

At block 114, if the determination at block 110 is affirmative, it is determined if the file has been updated. If the determination at block 114 is negative, the icon display method returns to block 106. At block 116, if the determination at block 114 is affirmative, an overlapped icon is displayed (e.g. icon of FIG. 2, etc.) with an indication the data was updated and, in turn, the icon display method returns to block 106.

Figure 5:
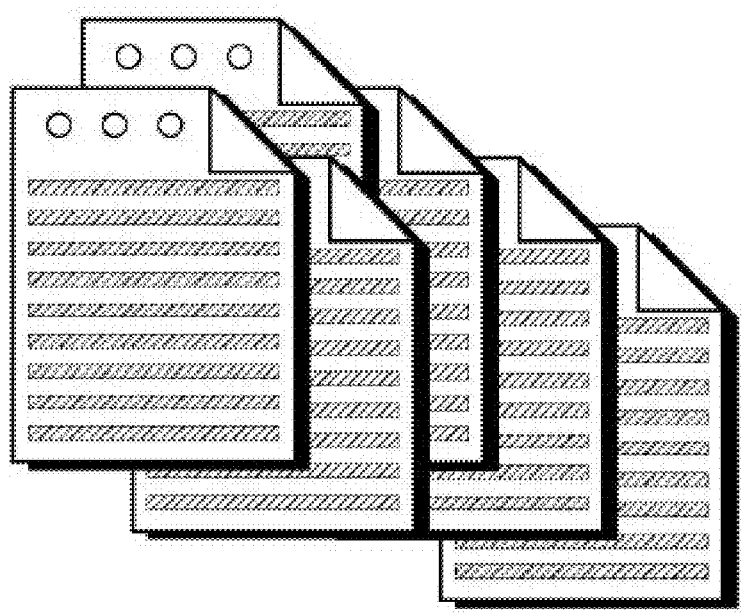
FIG. 5 illustrates an example of an icon of a file recorded on a tape medium, updated three times, rolled back, and then updated twice again from an once updated file in accordance with embodiments of the present invention.

In the case of rolling back to and then updating older file information, although rolled-back update information may be ignored, it may also be represented by a rolled-back overlapping symbol as illustrated in FIG. 5.

Figure 6:
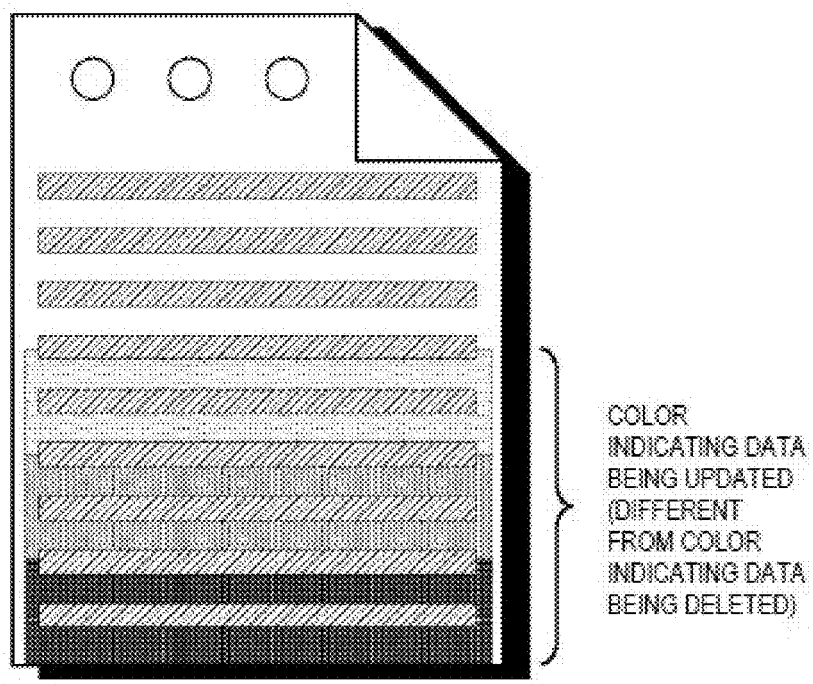
FIG. 6 illustrates an example of an icon of a file recorded on a tape medium and updated three times in accordance with embodiments of the present invention.
Figure 7:
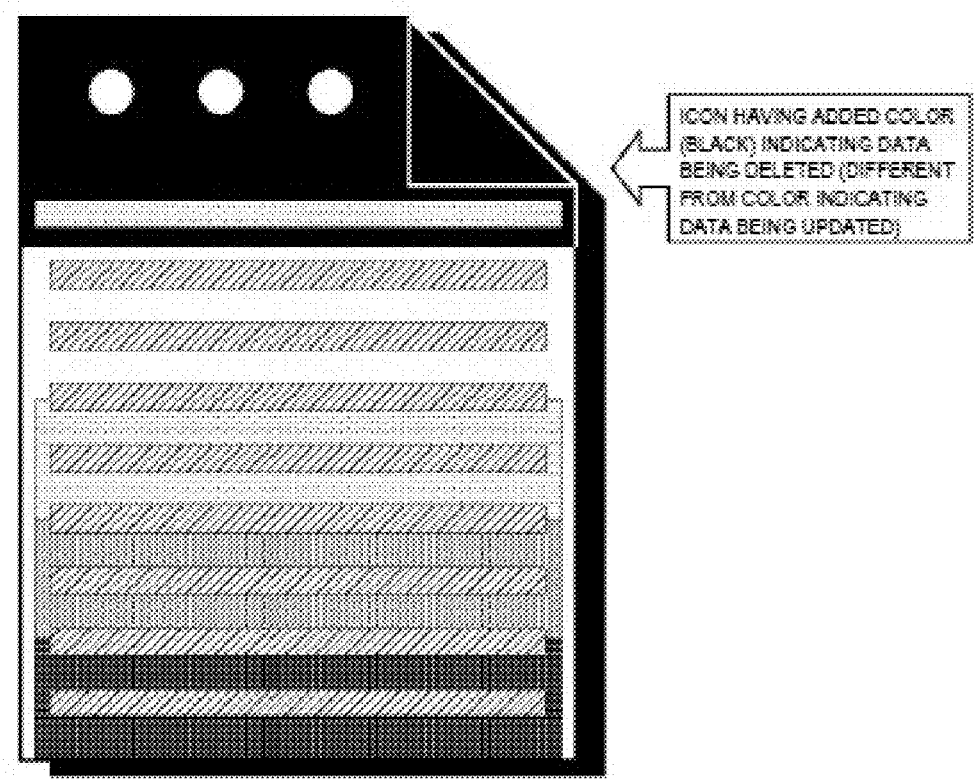
FIG. 7 illustrates an example of an icon of a file recorded on a tape medium, updated three times, and then deleted in accordance with embodiments of the present invention.

In another embodiment, a file that is recorded on a tape medium and remains not updated is denoted by an icon as illustrated in FIG. 1. A file that is recorded on a tape medium and then updated is denoted by adding colors to an icon depending on the number of updates, as illustrated in FIG. 6. For example, as shown in FIG. 6, if the upper white part of the icon is clicked, the latest contents of the file are displayed, and if the bottom dark part of the icon is clicked, the oldest contents of the file recorded first on the tape medium are displayed. In embodiments, regarding the other colored portions, newer contents may be associated with upper parts. In embodiments, a color for indicating the file has yet to be updated may be a fixed color or the same color as that of the icon itself. As shown in FIG. 7, a file recorded on a tape medium and then deleted may be denoted using an added color (e.g., black) indicating the file has been deleted.

Figure 8:
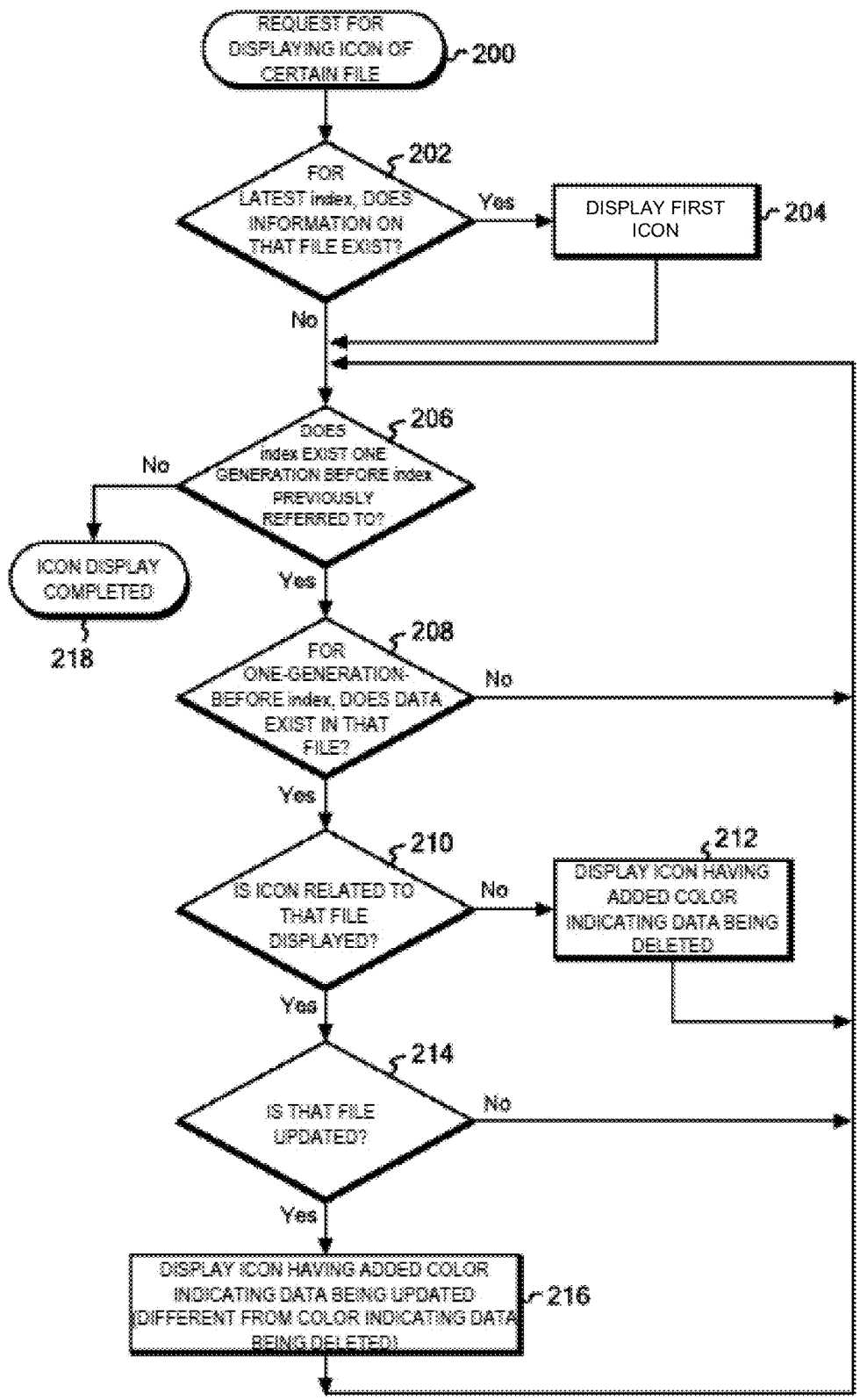
FIG. 8 is a flow chart of an exemplary method of displaying an icon in accordance with embodiments of the present invention.

FIG. 8 shows a flow chart of the behavior of LTFS for displaying an icon. At block 200, the LTFS receives a request that an icon associated with a file be displayed. At block 202, it is determined whether information on the file exists for the latest index. At block 204, if the determination at block 202 is affirmative, a icon (e.g. icon of FIG. 1, etc.) is displayed. At block 206, if the determination at block 202 is negative, it is determined whether an index exists one generation before the previous index. At block 218, if the determination at block 206 is negative, the icon display method is completed.

At block 208, if the determination at block 106 is affirmative, it is determined whether data exists in the file for the index one generation prior to the previous index. If the determination at block 208 is negative, the icon display method returns to block 206. At block 210, if the determination at block 208 is affirmative, it is determined whether an icon related to the file is displayed. At block 212, if the determination at block 210 is negative, an icon is displayed (e.g. icon of FIG. 7, etc.) with added color and an indication that data was deleted and, in turn, the icon display method returns to block 206.

At block 214, if the determination at block 210 is affirmative, it is determined if the file has been updated. If the determination at block 214 is negative, the icon display method returns to block 206. At block 216, if the determination at block 214 is affirmative, an icon with added color indicating the data was updated is displayed (e.g. icon of FIG. 6, etc.) and, in turn, the icon display method returns to block 206.

Figure 9:
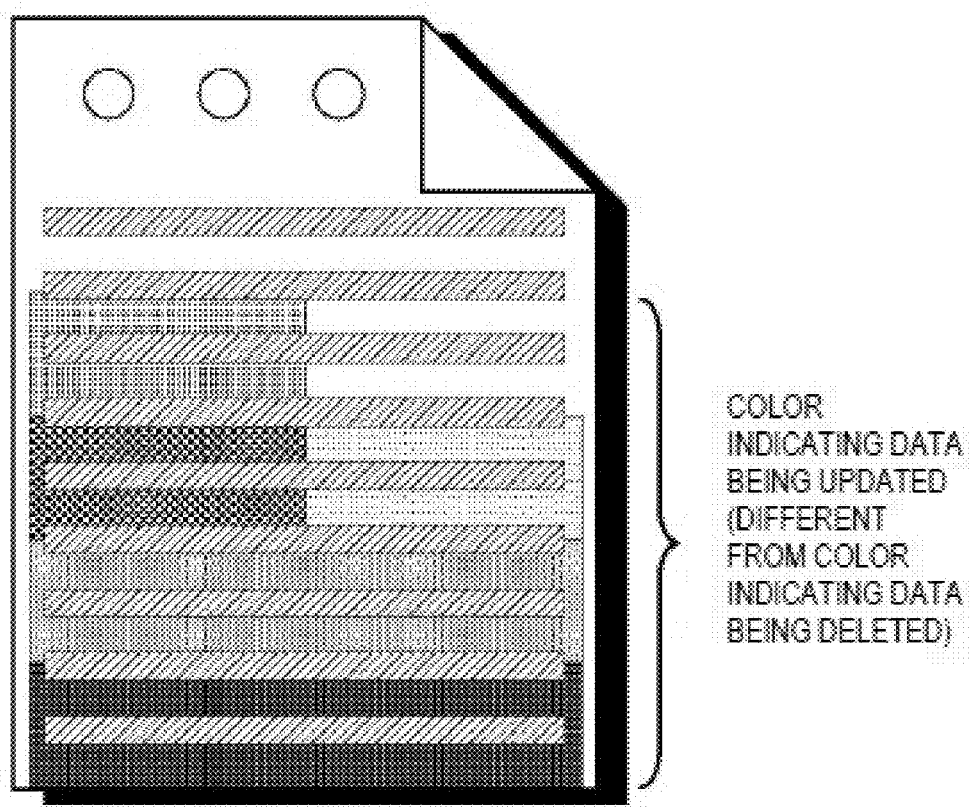
FIG. 9 illustrates an example of an icon of a file recorded on a tape medium, updated three times, rolled back, and then updated twice again from an once updated file in accordance with embodiments of the present invention.

In the case of rolling back to and then updating older file information again, although rolled-back update information may be ignored, it may also be represented by adding a plurality of colors (e.g., blue and green) to an icon as illustrated in FIG. 9. For instance, the icon ma be partitioned by color stacks associated with updates upon a color associated with the rolled-back file.

Figure 10:
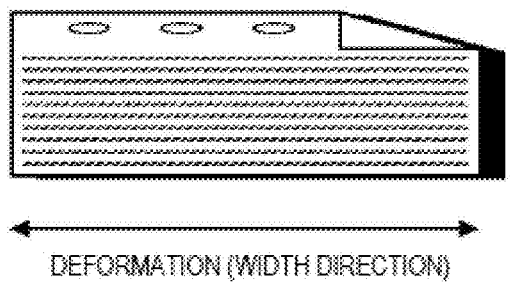
FIG. 10 illustrates an example of an icon of a file recorded on a tape medium and updated three times, the icon being four times as wide as a conventional icon, in accordance with embodiment of the present invention.

In another embodiment, a file that is recorded on a tape medium and remains not updated is denoted by an icon as illustrated in FIG. 1. A file that is recorded on a tape medium and then updated is denoted by extending an icon depending on the number of updates as illustrated in FIG. 10. For example, if a left part of the icon is clicked, the latest contents of the file are displayed, and if a right part of the icon is clicked, the oldest contents of the file recorded first on the tape medium are displayed. In embodiments, regarding such symbols, newer contents are associated with more left parts.

Figure 11:
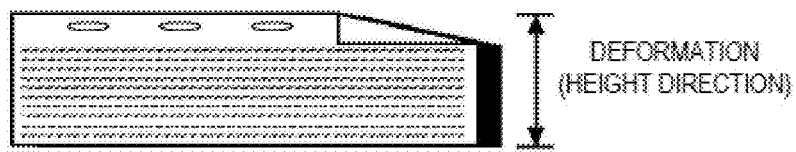
FIG. 11 illustrates an example of an icon of a file recorded on a tape medium, updated three times, and then deleted in accordance with embodiments of the present invention.

In another embodiment, as shown in FIG. 11, a file recorded on a tape medium and then deleted is denoted using a height-changed icon (e.g., half the height of a conventional icon) indicating the file being deleted.

Figure 12:
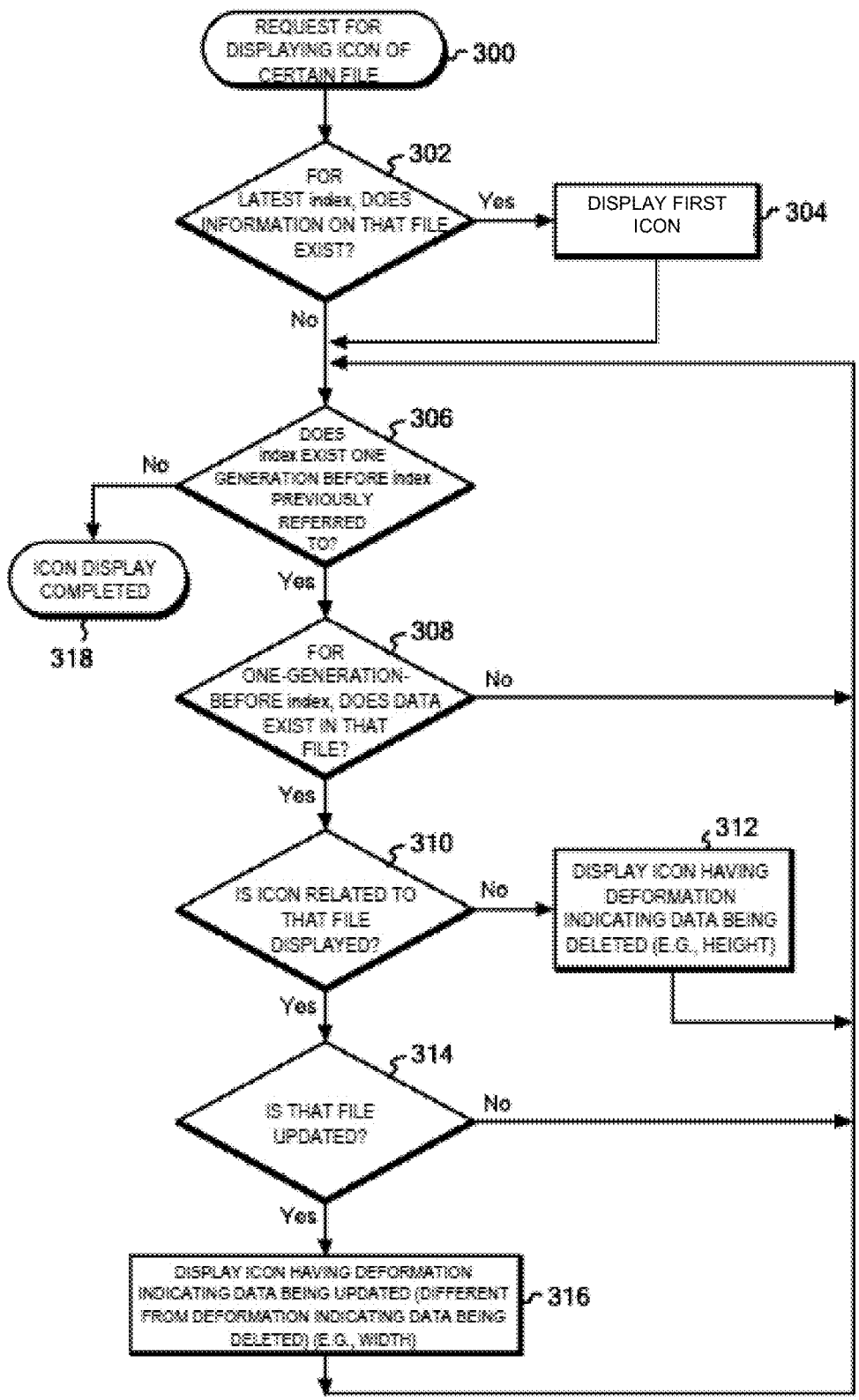
FIG. 12 is a flow chart of an exemplary method of displaying an icon in accordance with embodiments of the present invention.

FIG. 12 shows a flow chart of the behavior of LTFS for displaying an icon. At block 300, the LTFS receives a request that an icon associated with a file be displayed. At block 302, it is determined whether information on the file exists for the latest index. At block 304, if the determination at block 302 is affirmative, a icon (e.g. icon of FIG. 1, etc.) is displayed. At block 306, if the determination at block 302 is negative, it is determined whether an index exists one generation before the previous index. At block 318, if the determination at block 306 is negative, the icon display method is completed.

At block 308, if the determination at block 306 is affirmative, it is determined whether data exists in the file for the index one generation prior to the previous index. If the determination at block 308 is negative, the icon display method returns to block 306. At block 310, if the determination of block 308 is affirmative, it is determined whether an icon related to the file is displayed. At block 312, if the determination at block 310 is negative, an icon is displayed (e.g. icon of FIG. 11, etc.) with an indication that data was deleted and, in turn, the icon display method returns to block 306.

At block 314, if the determination at block 310 is affirmative, it is determined if the file has been updated. If the determination at block 314 is negative, the icon display method returns to block 306. At block 316, if the determination at block 314 is affirmative, an icon having deformation indicating the data was updated is displayed (e.g. icon of FIG. 10, etc.) and, in turn, the icon display method returns to block 306.

Figure 13:
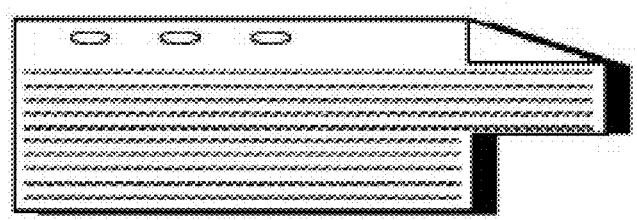
FIG. 13 illustrates an example of an icon of a file recorded on a tape medium, updated three times, rolled back, and then updated twice again from an once updated file in accordance with embodiments of the present invention.

In the case of rolling back to and then updating older file information again, although rolled-back update information may be ignored, it may also be represented by the combination of differently extended icons as illustrated in FIG. 13.

Generally, though the updated files are associated with width and deleted files are associated with height, as long as one deformation indicates data being deleted and another deformation indicates data being updated is sufficient. For example, the expansion and contraction associated with the updating or deleting may be in general differing directions.

Embodiments have been described herein referencing the rollback function of the linear tape file system (LTFS) in a tape medium, which is a type of storage, as an example. The idea, however, may also be broadly applied to any other storage mediums. In addition, the technical idea of the present invention may be implemented in various categories such as a method, a computer program product that which program instructions are stored which cause a computer to perform steps of a method, a system that implements a method, etc.

The embodiments of the present invention can be used advantageously, not only during formatting using the LTFS format, but also when an erase command is executed at the beginning of a tape medium. The embodiments of the present invention can be implemented not only as a method, but also as a program implementing the method, a system executing the method, and a tape medium using the method to record data.

The invention claimed is:

1. A method of displaying icons on a display, the icons associated with a history of a plurality of files related to respective plurality of indexes, each of the plurality of indexes and each of the plurality of files being additionally and synchronously recorded upon a storage medium as additional data, the method comprising:
   receiving a request for displaying an icon corresponding to a file recorded upon the storage medium;
   referring to a first index recorded upon the storage medium;
   determining that, for the first index, data exists in the file corresponding to the received request;
   displaying a first icon on a graphical user interface (GUI) by:
      displaying a first colored section having a first color within the first icon indicating updated data that appears in a current version of the file stored in the first index and does not appear in a second version of the file stored in a second index, wherein the second index is sequentially previous to the first index; and
      displaying a second colored section having a second color within the first icon indicating deleted data that appears in the second version of the file stored in the second index and does not appear in the current version of the file stored in the first index; and
   displaying the second version of the file based on user input to the GUI comprising the second colored section in the first icon being clicked.

2. The method according to claim 1, wherein the storage medium is a tape storage medium.

3. A method of displaying icons on a display, the icons associated with a history of a plurality of files related to respective plurality of indexes, each of the plurality of indexes and each of the plurality of files being additionally and synchronously recorded upon a storage medium as additional data, the method comprising:
   receiving a request for displaying an icon corresponding to a file recorded upon the storage medium;
   referring to a first index recorded upon the storage medium;
   determining that, for the first index, data exists in the file corresponding to the received request;
   displaying a first icon on a graphical user interface (GUI) by:
      deforming the first icon by expanding the first icon a first amount in a width direction indicating first data that appears in a current version of the file stored in the first index and does not appear in a second version of the file stored in a second index, wherein the first amount comprises a leftmost portion of the first icon;
      deforming the first icon by expanding the first icon a second amount in the width direction, wherein the second amount corresponds to second data that appears in the second version of the file stored in a second index and does not appear in a third version of the file stored in a third index;
         wherein the third index is sequentially previous to the second index, wherein the second index is sequentially previous to the first index;
      deforming the first icon by contracting the first icon a third amount in a height direction corresponding to third data, wherein the third data appears in the second version of the file stored in the second index and does not appear in the current version of the file stored in the first index; and
   displaying the second version of the file based on user input to the GUI comprising a portion of the first icon deformed by the second amount being clicked.

4. The method according to claim 3, wherein the storage medium is a tape storage medium.

5. The method according to claim 3, wherein the deformation indicating the data was deleted in and the deformation indicating the data is updated are expansion and contraction in orthogonal directions.

6. A computer-implemented method for displaying a first icon associated with various versions of a file, the method comprising:
   receiving, by a linear tape file system (LTFS), a request for displaying the first icon corresponding to a file recorded upon the LTFS on a graphical user interface (GUI);
   determining that, for a first index recorded upon the LTFS, data exists in a first file corresponding to the received request;
   determining that, for a second index sequentially prior to the first index, data exists in a second file corresponding to the received request, wherein a first difference between the first file and the second file comprises first data contained in the second file and deleted in the first file;
   determining that, for a third index sequentially prior to the second index, data exists in a third file corresponding to the received request, wherein a second difference between the second file and the third file comprises second data appearing in the second file that does not appear in the third file;
   displaying the first icon on the GUI, wherein the first icon comprises a black portion corresponding to the first data and a different colored portion corresponding to the second data; and
   displaying, on the GUI, the second file retrieved from the second index based on input to the GUI comprising the different colored portion of the first icon being selected.

7. The method according to claim 6, wherein the first icon further comprises an expanded portion of the first icon in a width direction, wherein the expanded portion of the first icon contains the different colored portion and corresponds to the second data.

* * * * *